Aug. 11, 1959 A. CHAUSSON 2,899,124
ELECTRO-MAGNETICALLY MAINTAINED OSCILLATING
MOVEMENT HERMETIC COMPRESSOR
Filed March 23, 1956 3 Sheets-Sheet 1

INVENTOR
ANDRÉ CHAUSSON
BY

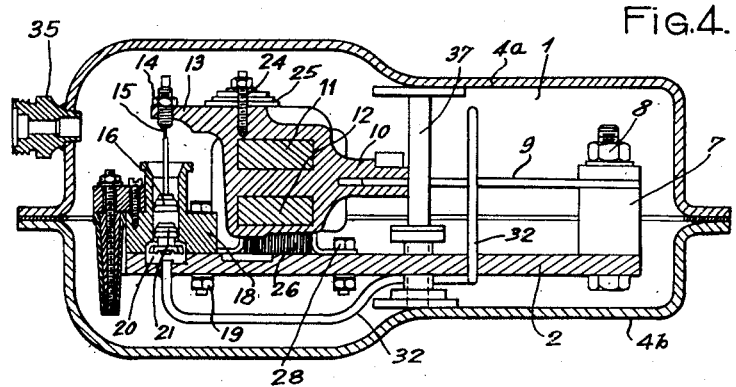
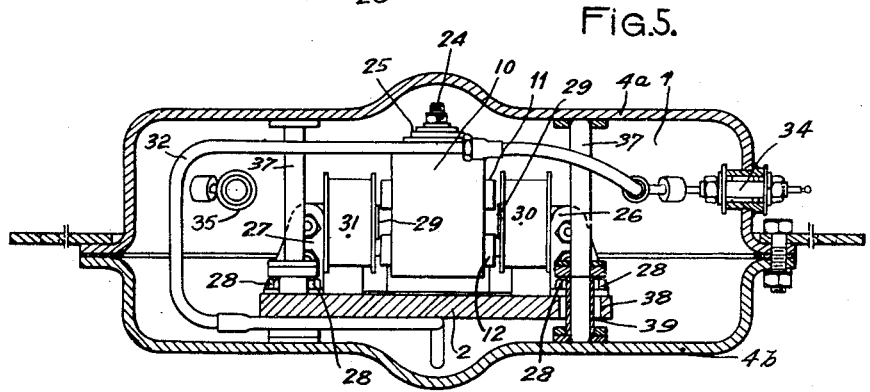
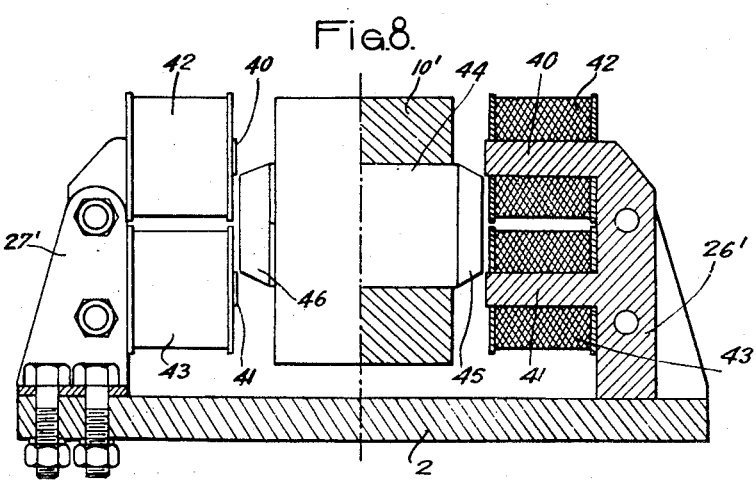

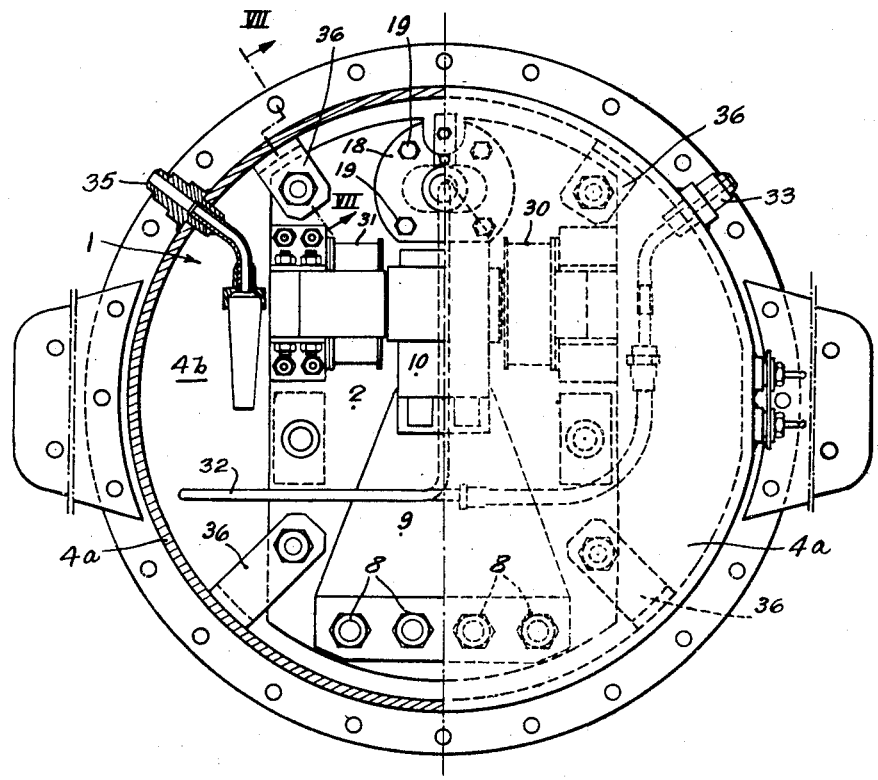
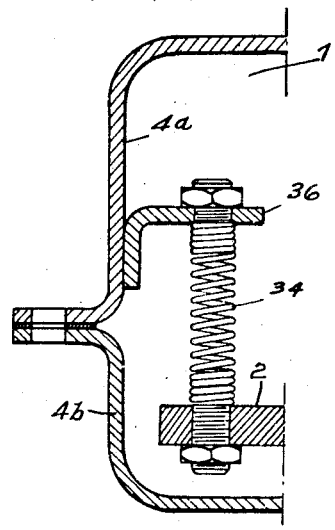

United States Patent Office 2,899,124
Patented Aug. 11, 1959

2,899,124

ELECTRO-MAGNETICALLY MAINTAINED OSCILLATING MOVEMENT HERMETIC COMPRESSOR

André Chausson, Asnieres, France, assignor to Societe Anonyme des Usines Chausson, Asnieres, France, a company of France Application March 23, 1956, Serial No. 573,550

Claims priority, application France March 25, 1955

8 Claims. (Cl. 230—55)

The present invention relates to hermetically sealed compressors, especially for refrigeration apparatus, and more particularly to electromagnetically operated compressors in which the magnetically polarized armatures oscillate in an alternating field produced by coils fed with alternating current.

The present invention applies more particularly to frequency tuned apparatus in which movable assemblies comprise compressor members and the polarized armatures are carried by flexible elements, preferably formed by spring blades whose resilient characteristics are so determined that these mobile units have a natural vibration frequency which is slightly less than the frequency of alternating current. This type of apparatus has the advantage of being self-regulating, for, when the counter-pressure of the fluid delivered increases, as is the case with a refrigeration apparatus in which the pressure in the condenser increases with the surrounding atmosphere temperature, the resilient forces applied to the movable assemblies also increase, which has the effect of causing the apparatus to work closer to the tuning frequency, and consequently, under output conditions which increase with the work to be done.

The use of polarized armatures also enables the number of cycles of the movable assemblies to be reduced by half during the time unit for a given alternating current frequency, which is most important in a piston machine, as is the case with apparatus according to the present invention, for it enables a proper filling of the compression chambers, because the input speed of the fluid to be compressed in the cylinders can be less for a given amplitude of the stroke of the pistons.

For commercial apparatus of this type, it is advantageous that the masses in movement should not be too great, but, on the other hand, and inversely the dimensions of certain members and more particularly the pistons need not be too small, so that their mechanical strength is sufficient to ensure working without breakdown over a very long period of years.

These problems have already been solved in a suitable manner in existing apparatus comprising two movable assemblies carried by two vibrating blades and working in opposition in axially aligned cylinders. However, the power obtained by these compressors frequently is too great for small capacity refrigeration appliances, especially those between 60 and 150 litres, which consequently leads to using overpowerful compressors whose manufacturing and operational cost is out of proportion with the equipment, particularly as the compressor is only in operation for short periods of time.

The present invention seeks more particularly to obviate this disadvantage by producing a new compressor having only one mobile unit comprising one vibrating blade carrying a polarized armature and directly driving a piston.

The development of this compressor nevertheless has given rise to problems that were difficult to solve, for the balancing, formerly obtained by causing the two movable assemblies to work in opposition, was no longer possible, so that the magnetic circuit and the cylinders could no longer be kept motionless during the displacement of the pistons, which, "a priori," led to irregularities in working, more particularly with regard to the pressure variations of the fluid delivered. Moreover, the good electromagnetic output of appliances already manufactured had been obtained by making the two movable assemblies co-operate for the circulation of the lines of forces of the alternating magnetic field.

The present invention completely solves this complex problem. According to the invention, an electromagnetic polarized armature frequency tuning compressor, comprising at least one permanent magnet, carried by a resilient support for oscillating in the airgap of a magnetic circuit, is characterised particularly in that the magnetic circuit comprises two identical elements placed symmetrically in relation to the polarized armature, these elements respectively comprising at least one induction coil and a polar part lagged in relation to the polarized armature when the latter is motionless, said identical elements of the magnetic circuit being mounted on a magnetic support through which the alternating magnetic flux passes during working, and on which are fixed the resilient support of the polarized armature and the cylinder unit in which the piston operates.

This particular embodiment, in which the body of the compressor and the movable assemblies are mechanically connected to each other, has the effect of causing the body to oscillate at the same frequency as the movable assemblies, but in phase opposition. However, the mass of the body of the compressor being very great in relation to that of the movable assemblies, it follows that the amplitude of oscillation of this body is very small and can practically be ignored, for the opposed movements are the same for the magnetic part and the compression part of the apparatus, which are rigid with each other.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Fig. 4 is an elevation section similar to Fig. 1, illustrating an alternative embodiment.

Fig. 5 is a section similar to Fig. 4, but turned by 90°.

Fig. 6 is a plan corresponding to Figs. 4 and 5, the left part of one of the compressor elements being cut away.

Fig. 7 is a section, on a larger scale, taken along the line VII—VII of Fig. 6.

Fig. 8 is a partial section, on a larger scale, illustrating an alternative embodiment of the magnetic circuit of the compressor of the preceding figures.

Figure 1:
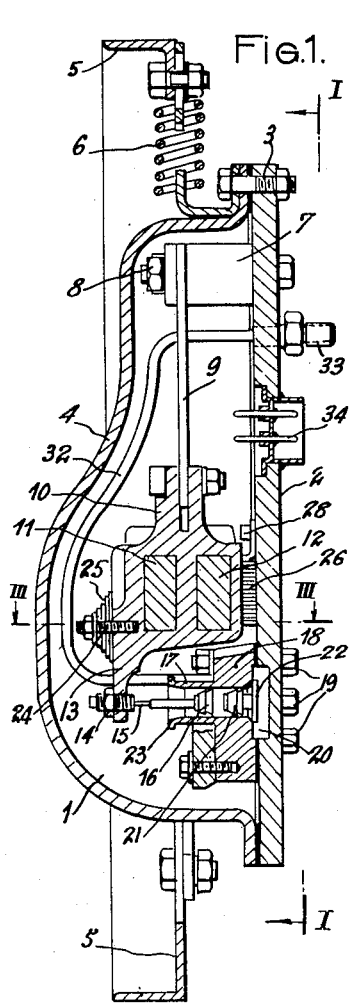
Fig. 1 is a longitudinal elevation section of the compressor device according to the invention.

The compressor device shown in the drawings is entirely enclosed in a fluid-tight enclosure 1 which is delimited by a plate 2 on one of whose sides a shell or casing 4 is fixed, by means of screws and nuts 3, said casing being of the shape shown.

The bell thus formed is connected to a structure 5 in the shape of a frame, by means of springs 6 or other suitable resilient elements intended to damp the vibrations to which the bell is subjected when the compressor mechanism is working, so that these vibrations are not transmitted to the refrigerator appliance, for example, in which this compressor is mounted.

The plate 2, which is intended to support the compressor assembly, has a bracket 7 at its upper part to which there is fixed, by means of screws and nuts 8 for example, a flexible plate 9 whose lower end carries a part 10 preferably made of metal conductive of electricity, but a magnetic, in which two permanent magnets 11 and 12 are embedded, which are placed so that their respective polarities are opposed. These polarities may, for example, be those shown in Fig. 3, where the letters N designate the north poles and the letters S the south poles.

The part 10, supporting and enveloping the magnets 11, 12, of which only the polar ends are visible, forms a lug 13 at its lower end to which there is fixed a connecting member 14 serving to connect this lug to a flexible rod 15, made of piano wire, for example, whose free end is integral with a piston 16 comprising a packing or lining in the shape of a cup made of flexible material, so that this packing can be distorted, as will be explained later.

The piston 16 slides in a cylinder 17 whose casing 18 is fixed, by means of screws 19, to the lower part of the plate 2 which is provided with a cavity 20 into which the liquid is discharged that is compressed by the piston 16 after it has distorted the flexible edges of a valve 21 completely closing the cylinder 17, this valve being sustained by a perforated plate 22, preferably rigid, so that the compressed liquid can never displace the valve 21, but merely distorts its flexible peripheral edges.

The cylinder 17 is provided at its fore part with a truncated part 23 enabling the liquid, which is to be compressed inside the cylinder, more easily to enter the latter when the piston 16 is placed near to its external dead centre.

The part 10 also serves to sustain, by means of a gudgeon-pin 24, calibrated washers 25 intended to confer on the movable assembly, formed by the resilient plate 9, the part 10, the magnets 11, 12, the piston 16 and its connecting members, an appropriate frequency of given vibrations.

Figure 3:
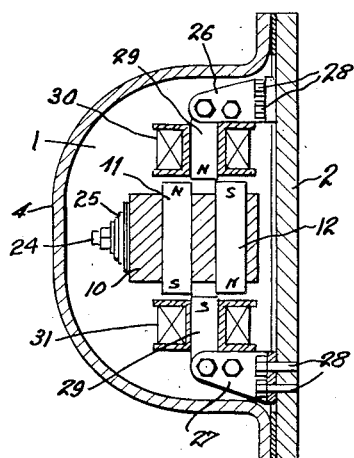
Fig. 3 is a transversal section taken along the line III—III of Fig. 1.

26 and 27 (Figs. 1 and 3) designate two identical elements formed of magnetic steel sheets piled so as to form two similar piles which are fixed to the plate 2 by means of screws 28 (Fig. 3).

The elements 26, 27, respectively form magnetic cores 29 on to which coils 30 and 31 are mounted, whose windings are connected up in series and fed with fixed frequency alternating current.

The width of the polar parts of the magnetic cores 29 is selected so as to be slightly larger than the space separating the two permanent magnets 11, 12, so that the lines of force coming from the latter may be closed by these polar parts, when the device is motionless, in the position shown in the drawing. Actually, as will be seen in Fig. 3, the lines of force coming from the north pole of the magnet 11 pass through the polar part of the core 29 to rejoin the south pole of the magnet 12. In like manner, the north pole of the latter magnet which is opposite to the polar part of the other magnetic core 29, has its lines of force which are directed towards the south pole of the magnet 11.

When the coils 30, 31 are fed with alternating current, at one moment $t$ the polar parts of the magnetic cores 29 have, for example, north and south polarities, so that the magnet 12 is attracted and the magnet 11 is repelled.

The magnet field coming from the magnetic cores 29 can thus close across the magnet 12 and the plate 2.

At the moment $t+1$, the polarity of the polar parts of the cores 29 is contrary to that shown in Fig. 3, so that it is the magnet 11 which is attracted and the magnet 12 repelled, the magnetic field closing in the same manner as that described above through the magnet 11 and the plate 2.

As will be seen from the foregoing, the magnetic field is, at any moment, closed, and moreover, it closes in the direction for which the feed of the permanent magnets 11, 12 tends to be increased.

The alternating movement to which the magnets 11, 12 are subjected is transmitted by the part 10 to the thin plate 9 which then vibrates in synchronism with the frequency of the alternating current feeding the coils 30, 31.

As already explained above, the frequency appropriate to the movable assembly is determined before-hand and is selected so as to be slightly lower than that of the feed current, so that the compressor does not function in resonance but only in synchronism so that the amplitude of the movement in which the piston 16 is driven does not reach an excessive magnitude which might run the risk of its striking the valve 21.

As can be clearly seen, when the piston 16 is displaced towards the inside of the cylinder 17, its flexible peripheral edge tends to contract allowing the liquid under low pressure contained in the enclosure 1 to enter the cylinder 17.

On the other hand, in its displacement towards the valve 21, the flexible edges of the piston 16 expand against the internal wall of the cylinder, compressing the liquid which escapes when its pressure is sufficient to produce distortion of the flexible edge of the valve 21, which allows it to enter the cavity 20 of the plate 2 from which it is directed, by a duct 32 and coupling 33, towards the condenser of the refrigerator apparatus.

The coils 30 and 31 are fed with alternating current by means of a plug connector 34 (Figs. 1 and 2) which traverses, as shown, the plate 2 as also does the duct 32 and a duct coupling 35 serve for conveying the liquid to be compressed into the enclosure 1.

Seeing that all the parts of the compressor are carried by the plate 2, it is extremely simple to have access to these parts, as it is only necessary to remove the casing 4 without disconnecting the connections, which makes overhaul and repairs particularly easy, when required.

According to the alternative embodiment of the compressor shown in Figs. 4 to 7, the half-casing 4a, which was formerly fixed directly on to the plate 2, is connected by its peripheral edge to a second half-casing 4b, so that the two half-casings form a fluid-tight enclosure 1.

Figure 2:
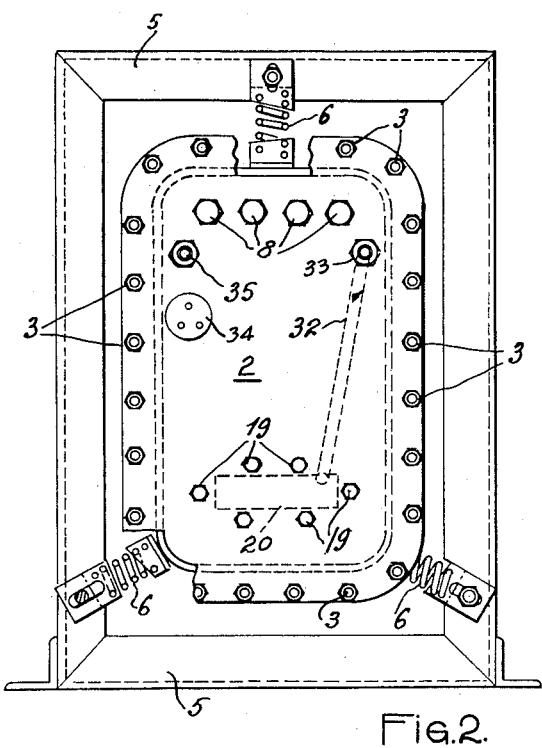
Fig. 2 is a lateral elevation corresponding to Fig. 1 but taken along the line I—I of the latter figure.

The various members forming the compressor are, as in Figs. 1 to 3, mounted on the plate 2 which is supported, within the enclosure 1, by means of resilient elements 6a which connect it with lugs 36 (Figs. 6 and 7) fixed to the half-casing 4a.

To enable the compressor to be easily disassembled, the various input and output pipings for the liquid to be compressed, as well as the electric connector 34, all traverse the half-casing 4a so that it is not necessary to remove the connections for obtaining access to the movable parts of the compressor.

37 (Figs. 4 and 5) designates small columns which are provided within the enclosure 1 between the half-casings 4a and 4b, these small columns passing through large diameter holes 38 (Fig. 5) in the plate 2.

The small columns 37 prevent the various elements of the compressor from striking the walls of the half-casings, more particularly when the compressor is moved for being mounted in a refrigerator and the latter is being transported from one place to another.

Resilient packings 39 (Fig. 5) are provided around the small columns at their part situated within the apertures 38 of the plate 2, so as to damp the impacts that may occur between this plate and said small columns.

On account of the particular method of suspension of the compressor inside the bell which surrounds it, it can be placed flat, as can be seen in the drawings, which has the effect of considerably reducing the space it occupies and enables it to be placed in a small area, underneath a refrigerator cabinet, for example.

Fig. 8 illustrates an alternative form of embodiment of the magnetic circuit of the compressor according to which the steel plates 26', 27' forming the magnetic circuit are cut out so as to make respectively two magnetic cores 40, 41 on which the coils 42, 43 are mounted.

In this case, the armature comprises only one permanent magnet 44 enveloped in the same manner as in the former case, in the part 10' made of a magnetic metal but conductive of electricity, this magnet also having poles 45 and 46 of soft iron whose width is selected so that when out of action these poles are placed very near to the polar parts of the magnetic cores 40 and 41 so that the flux issuing from the magnets can close when the compressor is not working.

Although certain specific embodiments of the invention have been shown and described, it is obvious that many modifications theerof are possible. The invention, therefore, is not to be restricted except insofar as is necessitated by the prior art and by the spirit of the appended claims.

I claim:

1. An electromagnetic motor for a compressor having a movable compressor element, comprising a support for the compressor and formed of magnetic material, a pair of electromagnets in spaced relation on said support and in magnetic relation therewith, a flexible blade on said support, and an armature magnet carried by said blade for connection with the movable compressor element, said armature magnet being insulated from said support and disposed between said electromagnets to complete a magnetic circuit through said support and be vibrated upon energization of said electromagnets with alternating current to drive the movable compressor element.

2. An electromagnetic compressor motor as set forth in claim 1 wherein said support comprises a rigid plate of substantial mass with respect to said armature magnet so that movement transmitted thereto is of small amplitude and of the same amplitude of movement imparted to the movable compressor element.

3. An electromagnetic compressor motor as set forth in claim 2 wherein said plate supports the compressor on one side thereof and said electromagnets, flexible blade and armature magnet are all disposed on said one side of said plate, and a housing shell secured to said plate in hermetically sealed relation and enclosing the compressor and said magnets and blade, whereby said plate constitutes one wall of a hermetically sealed housing.

4. An electromagnetic compressor motor as set forth in claim 1 wherein said armature magnet comprises two parallelly spaced permanent magnets disposed with their poles in opposite relation, and said electromagnets each comprise a polar extension completely spanning the space between the ends of said permanent magnets.

5. An electromagnetic compressor motor as set forth in claim 1 wherein said armature magnet comprises a single permanent magnet, and said electromagnets each comprise two polar extensions of opposite polarities and spaced a distance equal to the width of said permanent magnet.

6. An electromagnetic compressor motor as set forth in claim 5 wherein said permanent magnet is provided at each end with magnetic metal.

7. In an electromagnetic compressor, the combination of a compression unit, a plate supporting said compression unit, and an electromagnet having spaced poles with said plate defining an intermediate portion therebetween, a vibrating blade supported by said plate, a magnetic armature carried by said blade and disposed between said poles such that a closed magnetic circuit is defined by said electromagnet poles, said plate, and said armature, a compressor member in said compression unit driven by said armature, and said unit being mounted on said plate.

8. The combination of claim 7 wherein said plate has a large mass with respect to said armature so that movement transmitted to said plate from said armature by reaction during operation of the motor increases the stroke of said compression member.

References Cited in the file of this patent

FOREIGN PATENTS

| 506,875 | Belgium | Nov. 30, 1951 |
| 707,787 | Great Britain | Apr. 21, 1954 |
| 1,103,718 | France | Nov. 7, 1955 |